United States Patent
Miyashita

(10) Patent No.: US 11,890,882 B2
(45) Date of Patent: Feb. 6, 2024

(54) PRINTING DEVICE

(71) Applicant: BROTHER KOGYO KABUSHIKI KAISHA, Nagoya (JP)

(72) Inventor: Tomoki Miyashita, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 372 days.

(21) Appl. No.: 17/185,948

(22) Filed: Feb. 25, 2021

(65) Prior Publication Data

US 2021/0268809 A1     Sep. 2, 2021

(30) Foreign Application Priority Data

Feb. 28, 2020 (JP) ................ 2020-033444

(51) Int. Cl.
| | |
|---|---|
| *B41J 3/407* | (2006.01) |
| *G10L 15/26* | (2006.01) |
| *G10L 15/22* | (2006.01) |
| *G06F 3/16* | (2006.01) |

(52) U.S. Cl.
CPC ............ *B41J 3/4075* (2013.01); *G06F 3/167* (2013.01); *G10L 15/22* (2013.01); *G10L 15/26* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 2014/0282197 A1* | 9/2014 | Keefe | ................ | G16H 70/40 |
| | | | | 715/771 |
| 2017/0253027 A1* | 9/2017 | Kanda | ................ | B41J 3/4075 |
| 2019/0333511 A1* | 10/2019 | Huang | ................ | G10L 15/26 |

FOREIGN PATENT DOCUMENTS

| | | | |
|---|---|---|---|
| JP | 2001-10159 A | | 1/2001 |
| JP | 2014123201 A | * | 7/2014 |

* cited by examiner

*Primary Examiner* — Matthew G Marini
(74) *Attorney, Agent, or Firm* — KENEALY VAIDYA LLP

(57) ABSTRACT

A printing device produces a printed matter by using a template including at least one text object each having any one of a plurality of attributes including a first attribute in which text content is freely input and a second attribute in which text content is selectively input from a plurality of character options. The printing device includes a control device configured to execute: acquiring the template from an external device; specifying one target text object; acquiring character data input by voice or text-converted by voice recognition; identifying an attribute of the target text object; and when the attribute is identified as the first attribute, assigning the acquired character data to the target text object as a character string, and when the attribute is identified as the second attribute, assigning a character string included in a character option corresponding to the acquired character data to the target text object.

16 Claims, 12 Drawing Sheets

FIG. 8

CLASSIFICATION OF CONTENT OF VOICE RECOGNITION TEXT

○ VOICE INPUT COMMAND (FIXED PHRASE: RESERVED WORDS)
1. FUNCTION COMMAND
   - "LOAD"
   - "EDIT"
   - "DELETE"
   - "PRINT"
2. EDIT COMMAND
2-1. BASIC EDIT COMMAND
   - "UPPER", "LOWER", "RIGHT", "LEFT", "NEXT", "PREVIOUS"
   - "NUMBER X"
   - "COMPLETE EDITING"
2-2. FREE INPUT EDIT COMMAND
   - "CLEAR"
   - "COMPLETE INPUT"

○ VOICE INPUT DATA (UNFIXED PHRASE: ELEMENT DATA DECOMPOSED BY PART OF SPEECH)

PRINTING DEVICE

CROSS-REFERENCE TO RELATED APPLICATION

This application claims priority from Japanese Patent Application No. 2020-033444 filed on Feb. 28, 2020, the content of which is incorporated herein by reference in its entirety.

TECHNICAL FIELD

The present disclosure relates to a printing device operated by voice input.

BACKGROUND

In a label printer that produces a label or the like, there has been proposed a method in which words input by voice is analyzed by voice recognition technology and a corresponding recognition code is output, and further, in which a product file that stores information to be printed on a label is searched by using a character code of a product name corresponding to the recognition code as a search term.

In the above related-art technology, voice input is merely used to input a keyword according to the search term for searching the product file that stores the information to be printed on the label. On the other hand, in a printing device such as the label printer, there has been a demand for voice input to perform operations such as directly and freely inputting print content itself or selecting from a plurality of options prepared in advance as the print content.

SUMMARY

An object of the present disclosure is to provide a printing device capable of improving convenience for a user when producing a printed matter that represents content of voice input by utterance.

In order to achieve the above object, disclosed here is a printing device configured to produce a printed matter by using a template including at least one text object arranged therein in a predetermined manner, in which each arranged text object having any one of a plurality of attributes including a first attribute in which text content is freely input and a second attribute in which text content is selectively input from a plurality of predetermined character options. The printing device includes: a conveyance device configured to convey a printed medium; a print head configured to print on the printed medium conveyed by the conveyance device; and a control device configured to execute; template acquisition processing of acquiring the template from an external device; object specifying processing of specifying one target text object of the least one text object included in the template acquired in the template acquisition processing; data acquisition processing of acquiring character data input by voice or text-converted by voice recognition; attribute identification processing of identifying an attribute of the target text object specified in the object specifying processing; and character assignment processing of, when the attribute of the target text object is identified as the first attribute in the attribute identification processing, assigning the acquired character data to the target text object as a character string, and when the attribute of the target text object is identified as the second attribute in the attribute identification processing, assigning a character string included in a character option corresponding to the acquired character data among the plurality of character options to the target text object.

In the printing device according to the present disclosure, a printed matter is produced using the template. At least one text object is arranged in the template, and characters desired by a user can be input to the text object. In this case, in the present disclosure, so-called voice input can be performed by utterance of the user.

That is, for example, as the user makes a desired utterance by voice to an appropriate speaker, the utterance content is text-converted by a known method using an appropriate conversion processing unit (including a conversion site on a cloud or a site), and is converted into character data. Alternatively, when the printing device according to the present disclosure includes the conversion processing unit, the utterance content is text-converted by the conversion processing unit, and is converted into the character data. In the present disclosure, the control device executes the data acquisition processing to acquire the character data.

On the other hand, as described above, the control device executes the template acquisition processing, and thus, the template used for printing is acquired from the external device. When the template is acquired, one text object included in the template is specified as the target text object to be applied to the character assignment processing or the like described later, by the object specifying processing executed thereafter. The target text object specified at this time may be displayed (blinking-displayed, highlighted-displayed or cursor-displayed) in a mode corresponding to the above specification by, for example, an appropriate display included in the printing device, or it may be notified by voice that the target text object is specified.

Here, in the present disclosure, a plurality of attributes related to the text content of the character data are prepared for the text objects included in the template. In a case of a text object having the first attribute, the text content can be freely input to the text object (free input, so-called free word). In a case of a text object having the second attribute, the text content cannot be freely input as the text object having the first attribute, and any one of the plurality of character options prepared in advance is selected, whereby content of the selected one character option can be input.

Then, for the target text object specified as described above, what is the attribute of the target text object is identified by the attribute identification processing executed thereafter.

When the attribute of the target text object is the first attribute, the character data converted from the voice acquired as described above is assigned to the target text object as the character string in the character assignment processing executed thereafter. Thereby, for example, when the user utters "Taro Horita" as a personal name, character data of the corresponding "Taro Horita" is inserted in the above target text object of the template. Then, by printing on the printed medium using the template, a corresponding printed matter (for example, a print label that represents "Taro Horita") is produced. In this manner, free utterance content of the user can be directly represented in the printed matter.

On the other hand, when the attribute of the target text object is the second attribute, the character string included in one character option corresponding to the acquired character data among the plurality of character options prepared in advance is assigned to the target text object in the character assignment processing. For example, when "No. 1" (or "First") is uttered in order to select a personal computer from a first option "personal computer", a second option "telephone" and a third option "desk lamp" as items to be managed, character data of the corresponding "personal computer" is inserted into the target text object of the template. Then, by printing on the printed medium using the template, a corresponding printed matter (for example, a print label representing "personal computer") is produced. In this way, corresponding content can be represented in the printed matter by the user merely making the utterance of selecting any one of the options. By making the utterance only for selecting an option in this way, even in a case where, for example, a surrounding environment is noisy and the user inputs voice by free utterance, thereby causing erroneous recognition and acquiring erroneous character data, the printed matter of the content intended by the user can be reliably produced.

As described above, in the present disclosure, since two attributes including the first attribute and the second attribute are prepared in advance for the text object of the template, when performing voice input by uttering the content to be assigned to the target text object included in the template, the user can input by a convenient method according to an own preference, a surrounding environment and the like. Thereby, convenience for the user when producing the printed matter that represents the content of the voice input by the utterance can be improved.

According to the present disclosure, the convenience for the user when producing the printed matter that represents the content of the voice input by the utterance can be improved.

BRIEF DESCRIPTION OF DRAWINGS

The above and other aspects of the present invention will become more apparent and more readily appreciated from the following description of illustrative embodiments of the present disclosure taken in conjunction with the attached drawings, in which:

FIG. 8 is a diagram showing classification of content of voice recognition texts;

DETAILED DESCRIPTION

Figure 1:
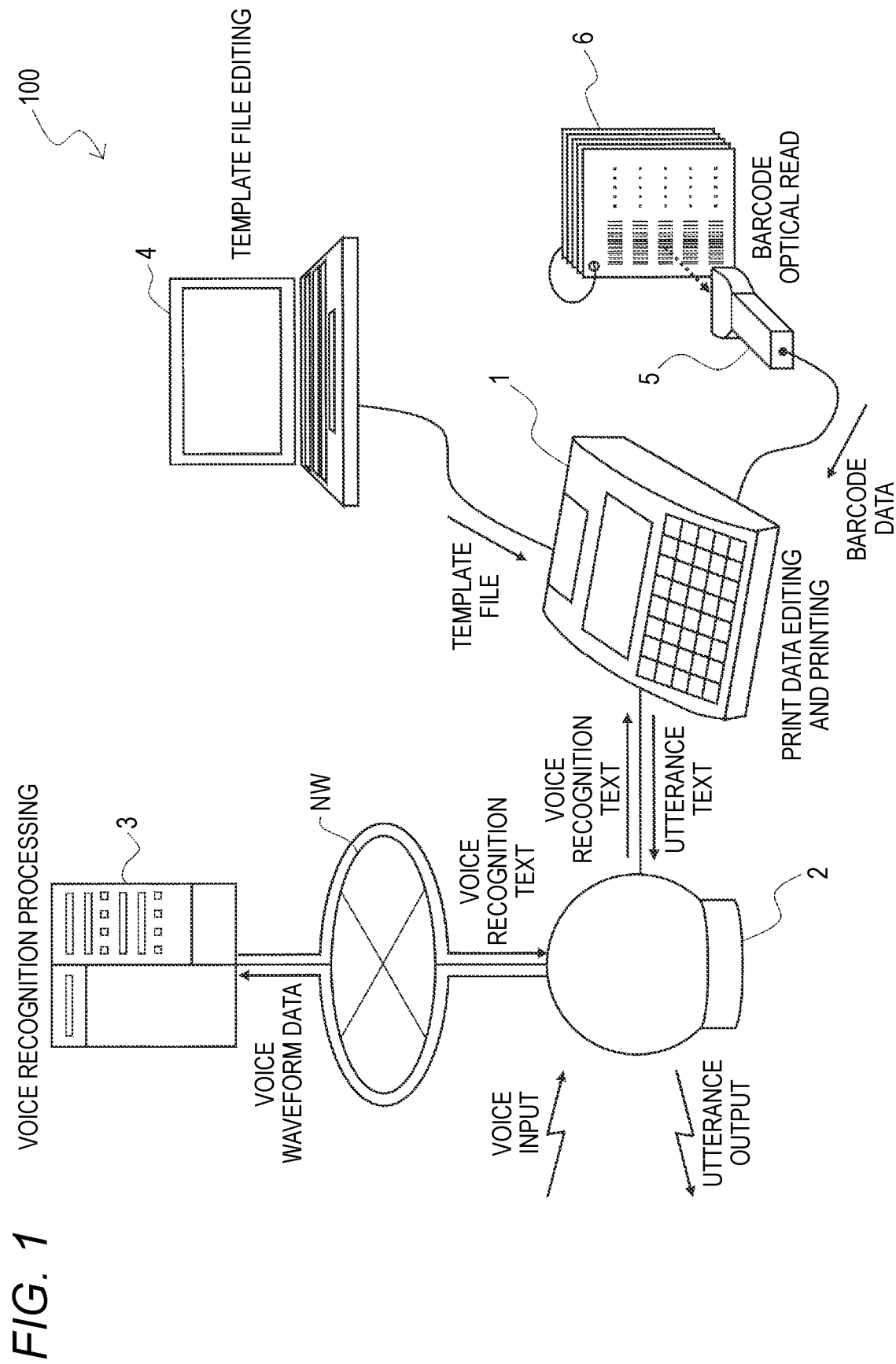
FIG. 1 is a system configuration view showing an outline of a label producing system according to an embodiment of the present disclosure.

Hereinafter, an embodiment of the present disclosure will be described in detail with reference to the accompanying drawings. In the present specification and the drawings, components having substantially the same function are denoted by the same reference numerals in principle. Then, duplicate description of these components will be omitted as appropriate.

<System Schematic Configuration>

First, a configuration of an entire label producing system including a label printer according to a printing device of the present embodiment will be described with reference to FIGS. 1 and 2.

In FIG. 1, a label producing system 100 includes a label printer 1 serving as a printing device, a smart speaker 2 connected to the label printer 1 via a network such as a wired LAN, a voice recognition server 3 connected to the smart speaker 2 via an external communication network NW such as the Internet, an operation terminal 4 connected to the label printer 1 via an interface such as a USB, and a barcode reader 5 connected to the label printer 1 via an interface such as a USB. The network or interface such as the wired LAN and the USB may have a wireless connection other than a wired connection as in the shown example.

The smart speaker 2 includes a microphone 21 and a speaker 22 therein (see FIG. 2 described later), and collects a voice uttered by a user through the microphone 21 and transmits waveform data of the voice to the voice recognition server 3 via the external communication network NW. Then, the voice recognition server 3 analyzes the received voice waveform data by voice recognition processing so as to converts into and generates character string data corresponding to an utterance content expressed by the voice waveform data as a voice recognition text, and returns the voice recognition text to the smart speaker 2. The smart speaker 2 transmits the received voice recognition text directly to the label printer 1. The smart speaker 2 itself may execute the voice recognition processing to analyze the voice waveform data and generate the voice recognition text. Upon receiving an utterance text of the character string data from the label printer 1, the smart speaker 2 outputs an utterance from the speaker 22 to the user with a voice waveform expressing content of the utterance text. The voice recognition text corresponds to character data.

The operation terminal 4 includes, for example, a general-purpose personal computer, a smartphone or a tablet terminal, and edits and creates a template file according to an operation from the user and transmits the created template file to the label printer 1. Content of the template file and the editing thereof will be described in detail later. The operation terminal 4 corresponds to an external device.

The barcode reader 5 optically reads a predetermined barcode and outputs corresponding barcode data to the label printer 1. In the shown example, a large number of barcodes corresponding to various pieces of information are printed in advance on a booklet 6 or the like together with corresponding explanations, and a barcode freely selected by the user from the barcodes is read by the barcode reader 5.

The label printer 1 executes various types of processing based on the voice recognition text received from the smart speaker 2 or the barcode data input from the barcode reader 5. Examples of the various types of processing include processing of receiving the template file from the operation terminal 4, processing of editing print data based on the template file, and processing of producing a print label with printing of desired characters and graphics based on the generated print data. An internal configuration of the label printer 1 will be described in detail later with reference to FIG. 2.

Figure 2:
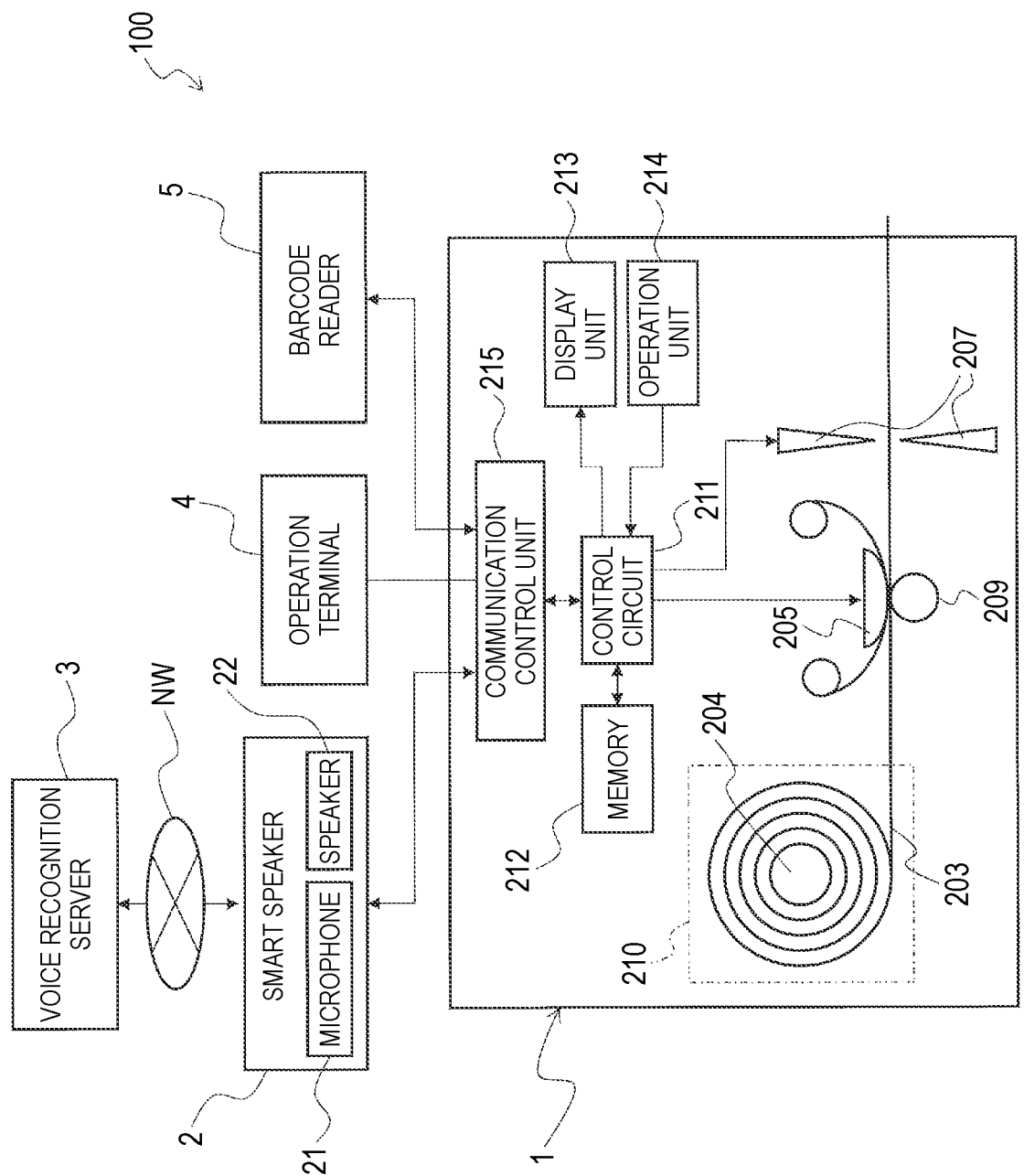
FIG. 2 is a functional block diagram showing detailed functions of the label producing system.

As shown in FIG. 2, the label printer 1 includes a tape roll holder 210 to and from which a tape roll 204 wound with a tape 203 as a printed medium is attachable and detachable (or to and from which a cartridge including the tape roll 204 is attachable and detachable), a print head 205 that performs desired printing on the tape 203 unwound from the tape roll 204, a cutter 207 that cuts the printed tape 203 to a predetermined length to make a print label, and a conveyance device 209 that is provided facing the print head 205 and conveys the tape 203 from the tape roll 204. The tape 203 is originally spiral, but in FIG. 2, is the tape 203 is simplified and shown in concentric circles. The conveyance device 209 includes a conveyance roller, for example. The label printer 1 also includes a control circuit 211, a memory 212, a display unit 213, an operation unit 214 and a communication control unit 215.

According to various programs stored in the memory 212 including a ROM, a RAM, a flash memory, for example, the control circuit 211 controls the print head 205, the cutter 207 and the conveyance device 209 in cooperation with each other and controls the entire label printer 1 by executing the various types of processing described above. The control circuit 211 executes various types of control and processing based on various types of data and commands transmitted and received to and from the smart speaker 2, the operation terminal 4 and the barcode reader 5 via the communication control unit 215.

The operation unit 214 includes, for example, hardware keys such as function keys or character keys (not particularly shown), and mechanically receives an input operation from the user.

The display unit 213 includes, for example, a liquid crystal display (not particularly shown), and optically displays predetermined information to the user.

The conveyance device 209 corresponds to a conveyance device, the print head 205 corresponds to a print head, the control circuit 211 corresponds to control device, the memory 212 corresponds to a memory, the communication control unit 215 corresponds to connection device, and a print label L corresponds to a printed matter.

<Template File and Print Data>

When the print label L is produced in the label printer 1, it is very complicated for an operator to manually set all the content such as character strings to be printed on the print label L through the operation terminal 4. Therefore, in the present embodiment, a so-called template file in which arrangement frames for a plurality of text objects corresponding to a plurality of character strings or the like are arranged in a predetermined manner is used. The user edits the template file in advance in a print mode of the text object according to an own intention by an operation on the operation terminal 4, and edits the content of the character string included in the text object that is not set in the template file with the label printer 1 to finally generate the print data usable for printing. Thereby, the desired print label L can be easily produced by only partially editing the template file used in common.

Figure 3:
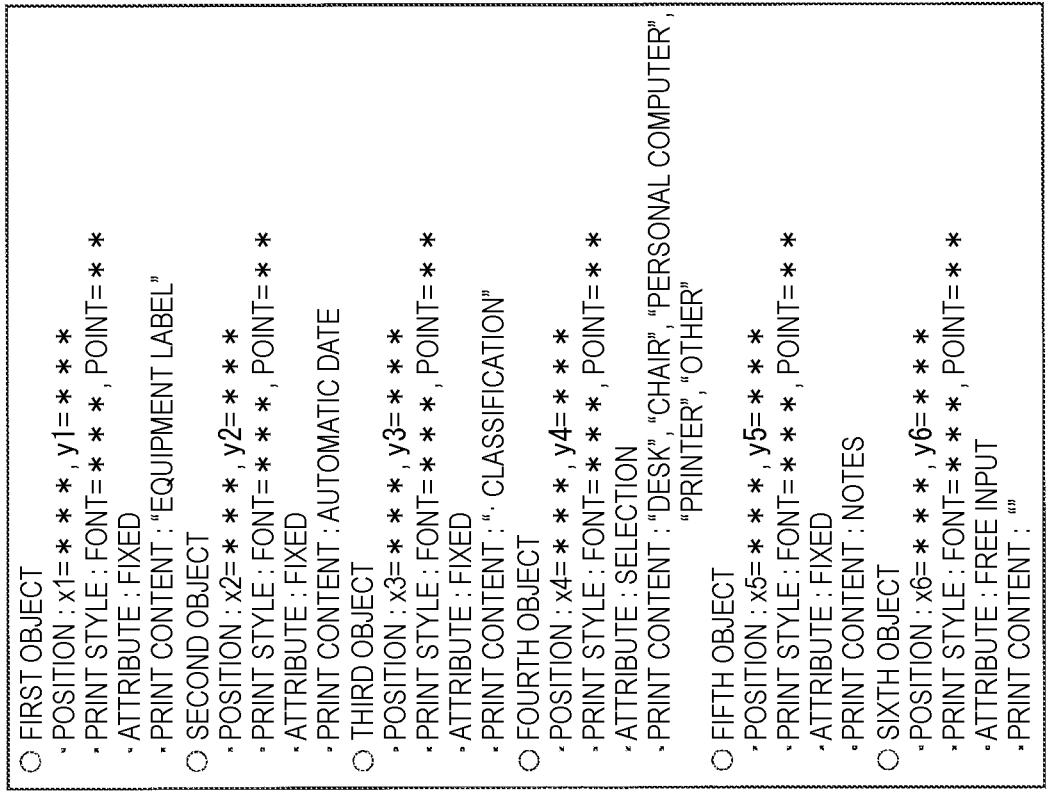
FIG. 3 is a diagram showing an example of a template file and a print label produced based on the template file.

FIG. 3 shows examples of the template file as described above and the print label L produced based on the template file. In the template file of the example shown on a left side in FIG. 3, six text objects to be printed on the print label L are set. Items of a position, a print style, an attribute and a print content are set for each of the first to sixth objects corresponding to the text objects. In the item of the position, coordinate positions (x, y positions) that represents an arrangement of the text object on the print label L are set. In the item of the print style, information such as a font or a point when the text object is printed is set. In the item of the attribute, attribute information related to designation of the print content of the text object is set. In the item of the print content, the character string of the print content printed in the text object is set.

Here, in the shown example, the print content of "equipment label", an automatic date corresponding to a printing time ("2019.8.19" in the shown example), "classification" and "notes" are fixedly or automatically set for each of the first, second, third and fifth objects, which cannot be changed by the user in print data editing with the label printer 1. That is, the attribute for designating the print content of each text object is set to "fixed". Thereby, the print content of the first, second, third and fifth objects are printed in common on all the print labels L produced based on the template file.

In the fourth object of the shown example, any one of the character strings of "desk", "chair" "personal computer" and "printer" is selectively set as the print content by the user in the print data editing with the label printer 1. That is, the attribute for designating the print content of the text object corresponding to the fourth object is set to "selection". Character options of the print content as described above are preset by template editing on the operation terminal 4 as will be described later. The selection attribute corresponds to a second attribute.

In the sixth object of the shown example, the print content is initially set as a free content by the user in the print data editing with the label printer 1. That is, the attribute for designating the print content of the text object corresponding to the sixth object is set to "free input", and the print content is not set in the template file. The free input attribute corresponds to a first attribute.

The print label L of the example shown on a right side in FIG. 3 is produced in a case where the template file edited as described above is received by the label printer 1, the user selects and sets the print content of the fourth object as the character option of "printer" in the print data editing with the label printer 1 and inputs the print content of the sixth object with "When replenishing the color printing cartridge, contact the General Affairs Department."

As described above, the arrangement and style of all the text objects to be printed in advance and the print content fixed by some of the text objects are used in common based on the template file, and only the print content of other text objects that differs between the individual print labels L is individually selected or freely input, whereby the print label L can be easily produced.

<Template File Editing>

Figure 4:
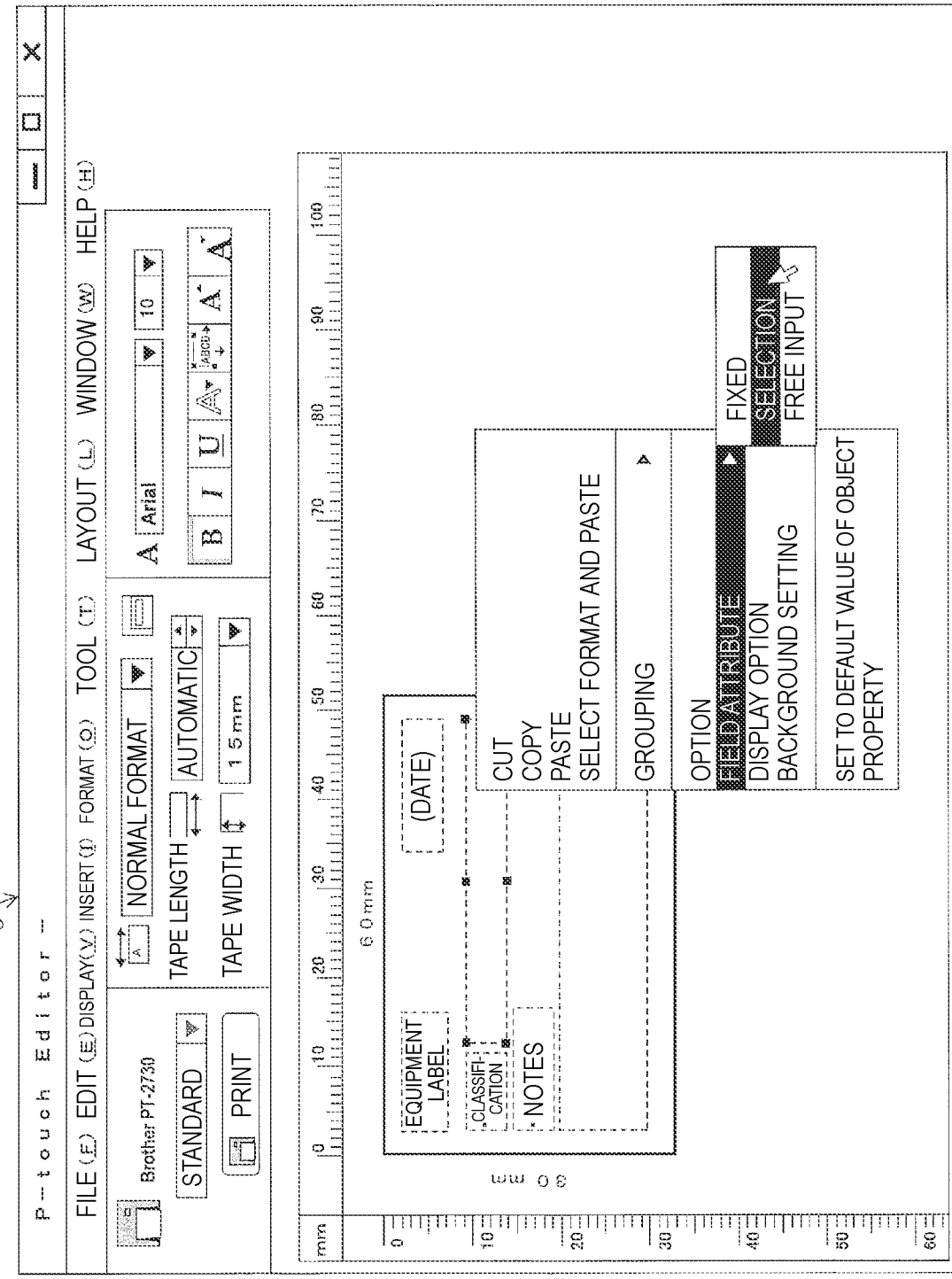
FIG. 4 is a diagram showing an operation screen of template file editing on an operation terminal.

Next, a specific operation of template file editing in the operation terminal 4 will be described. The template file editing performed on the operation terminal 4 is performed on an operation screen 30 as shown in FIG. 4, for example. In an example shown in the operation screen 30, a plurality of text objects (six text objects in this example) are displayed in dotted frames on the print label L, and a submenu is opened for one text object (the fourth object surrounded by black dots in the shown example) to be edited at that time. When a menu of "field attribute" is selected in the submenu of the shown example, a submenu for setting any attribute of "fixed", "selection" and "free input" is further opened. The attribute of the text object to be edited can be set by selecting and determining the desired attribute here.

Figure 5:
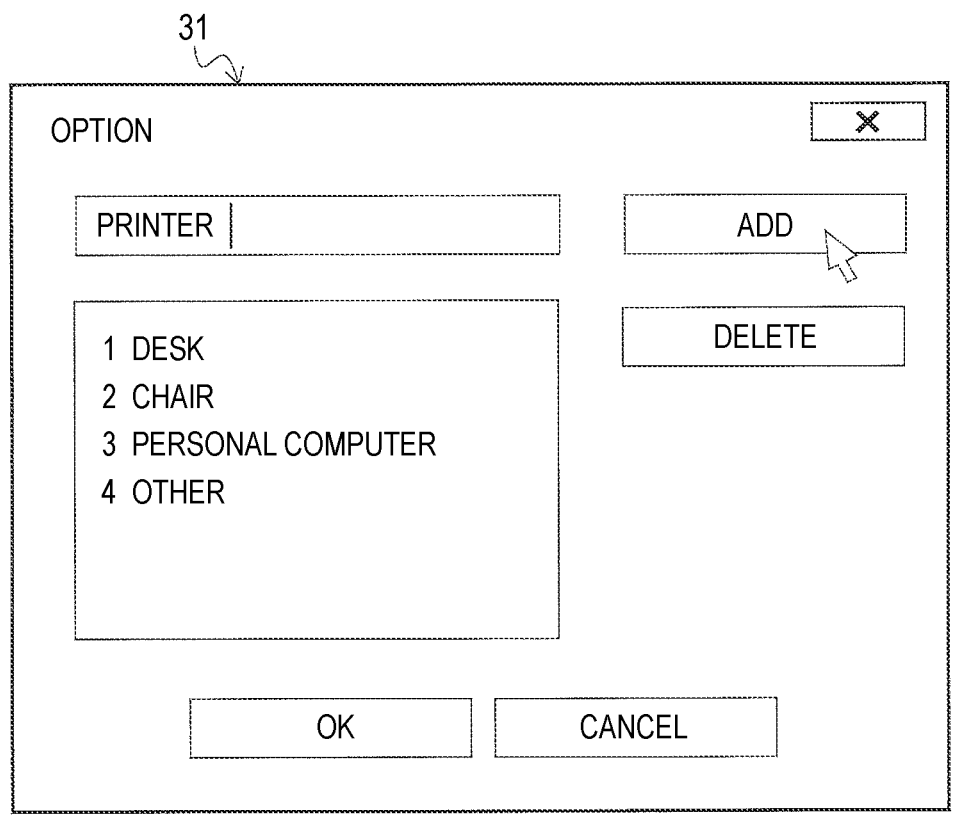
FIG. 5 is a diagram showing an operation screen for setting a character option in template file editing.

When the attribute of "fixed" is set at this time, it is necessary to separately set the print content of the text object (not particularly shown). When the attribute of "free input" is set, it is not necessary to set corresponding print content during editing of the template. When the attribute of "selection" is set as shown in the drawing, a separate operation screen 31 as shown in FIG. 5 is automatically displayed, and a plurality of character strings serving as the character options for the print content of the text object are set. In the shown example, identification numbers are automatically assigned to the plurality of character options respectively, and are recorded side by side in the template file in an order of the identification numbers. Alternatively, although not particularly shown, the character option and the identification number may be recorded in association with each other in the template file.

<Print Data Editing>

Next, a specific operation of print data editing in the label printer 1 will be described. As described above, in the print data editing with the label printer 1, two setting operations including selection setting of the print content for the text object having the selection attribute and free input setting of the print content for the text object having the free input attribute may be performed. In the example of the present embodiment, both a voice input operation via the smart speaker 2 and a barcode reading operation using the barcode reader 5 can be selectively performed in these two setting operations.

Figure 6:
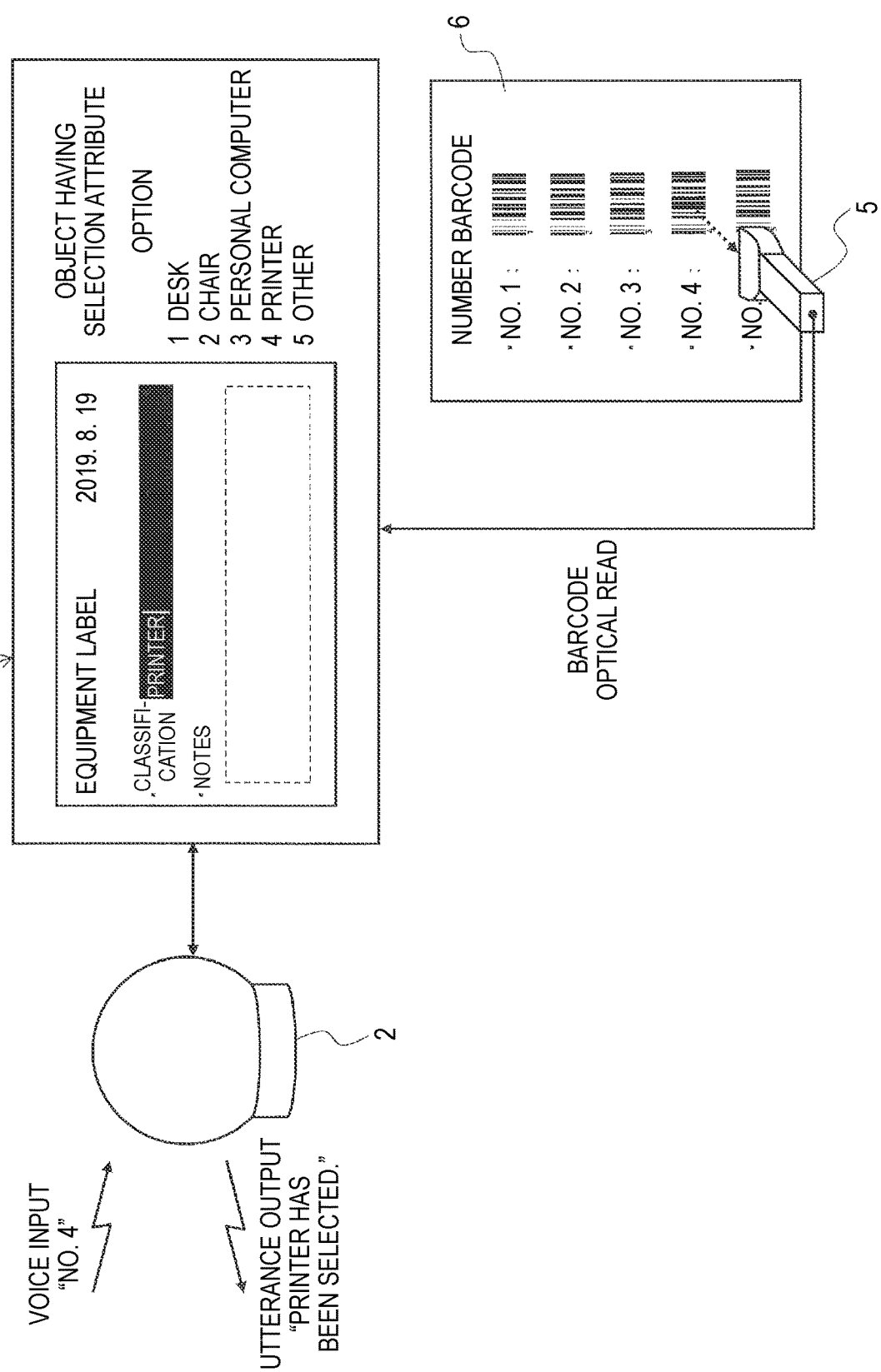
FIG. 6 is a diagram showing an example of a selection setting operation of print content for a text object having a selection attribute.

First, FIG. 6 shows an example of the selection setting operation of the print content for the text object having the selection attribute. When the print data editing is started, the label printer 1 displays the print content of the print label L according to the template file on the display unit 213. At that time, a text of the preset print content is displayed in each of the text objects of the first, second, third and fifth objects set in the fixed attribute. Among these, a date at that time ("2019.8.19" in the shown example) is displayed in the second object whose print content is set to the automatic date. On the other hand, the print content is not displayed as a blank in each text object of the fourth object and the sixth object that are respectively set to the selection attribute and the free input attribute, and only a broken line frame is displayed at an arrangement position thereof as shown in the drawing.

During the print data editing, the print content (or blank) of any one of the plurality of text objects is displayed in black and white inversion, and this display mode functions as a cursor indicating that the text object is a target text object to be edited at that time. The cursor moves between the text objects in response to an input of a cursor movement command described later.

FIG. 6 shows a state in which the selection setting operation is performed with the cursor located on the text object of the fourth object having the selection attribute. When the cursor reaches the text object and starts the selection setting operation, as shown in the drawing, a plurality of character options preset as the print content of the fourth object are listed and displayed on the display unit 213 together with corresponding identification numbers. At the same time, contents of the respective character options corresponding to the respective identification numbers may be output to the smart speaker 2 in a form of an utterance text to be utter-output (not particularly shown). In this case, for example, the smart speaker 2 utter-outputs an instruction such as "Please select from the options" to prompt the user to make a selection (not particularly shown).

Then, the user utters the identification number ("No. 4" in the shown example) corresponding to the character option freely selected from the displayed (or utter-output) character options, thereby performing the selection setting operation of the character option ("printer" in the shown example) by voice input via the smart speaker 2. At this time, the print content of the corresponding character option is displayed on the text object to be edited, and the smart speaker 2 also outputs an utterance to repeat with the corresponding content ("Printer has been selected" in the shown example).

Besides the voice input operation via the smart speaker 2 described above, the barcode reader 5 optically reads the barcode corresponding to the identification number selected by the user, whereby the selection setting operation of the corresponding character option may be performed.

Figure 7:
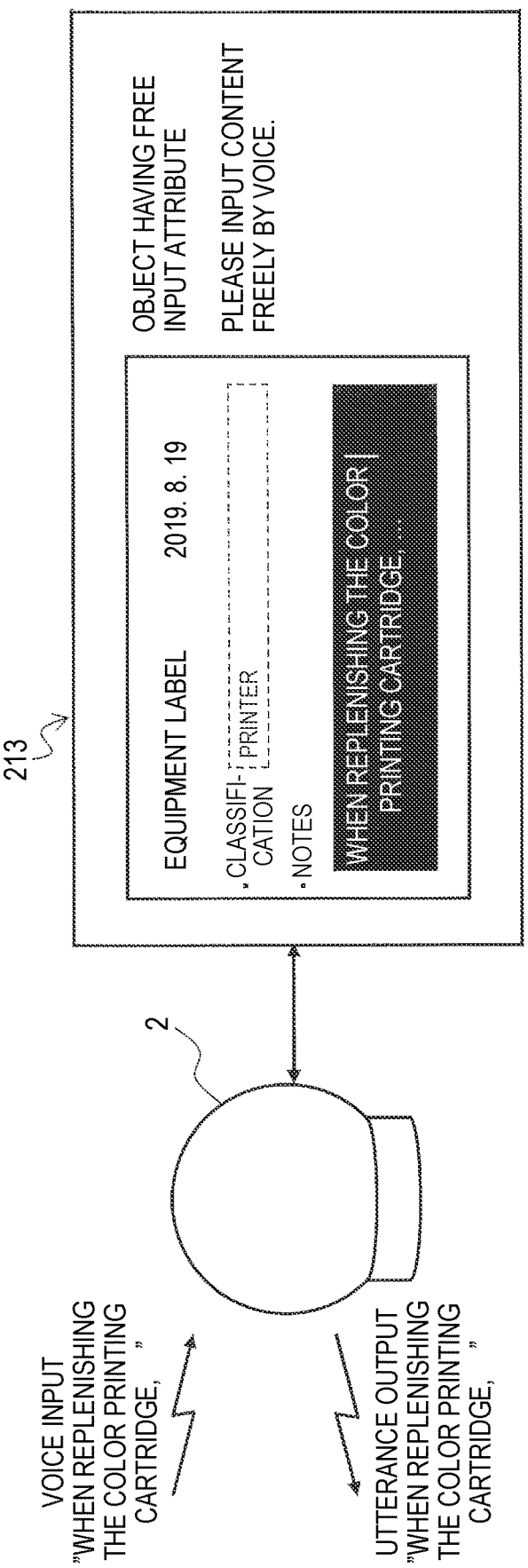
FIG. 7 is a diagram showing an example of a free input setting operation of print content for a text object having a free input attribute.

Next, FIG. 7 shows an example of the free input setting operation of the print content for the text object having the free input attribute. FIG. 7 shows a state in which the selection setting operation is being performed with a cursor located on the text object of the sixth object in the free input attribute. When the cursor reaches the text object and starts the free input setting operation, for example, the smart speaker 2 utter-outputs an instruction such as "Please perform free input by voice" to prompt the user to start free input (not particularly shown).

Thereafter, the user utters any print content, thereby performing the free input setting operation by the voice input via the smart speaker 2. At this time, the corresponding print content ("When replenishing the color printing cartridge, . . . " in the shown example) is displayed on the text object to be edited. Then, when the user completes the free input, the user utters "Complete input" to complete the free input setting operation (not particularly shown). After the free input setting operation is completed, the smart speaker 2 utter-outputs the entire corresponding print content so as to repeat the set content.

In order to perform the free input setting operation using the barcode reader 5, it is necessary to prepare a barcode corresponding to each sound in advance and then read the barcode, which is complicated. Accordingly, the free input setting using the barcode reader 5 is not performed in the present embodiment.

<Classification of Content of Voice Recognition Text>

As described above, in the present embodiment, the voice recognition text corresponding to the content input by voice via the smart speaker 2 is input to the label printer 1, and the label printer 1 executes various operations, settings and the like based on the content of the voice recognition text. That is, the content of the voice recognition text is classified according to the operations, the settings and the like, and FIG. 8 shows the classification in the example of the present embodiment.

As shown in FIG. 8, the content of the voice recognition text is roughly classified into two types: a voice input command and voice input data. The voice input command corresponds to a command for instructing the label printer 1 to execute specific processing. The voice input data corresponds to, for example, data such as the print content itself that is input by voice in the free input setting.

The voice input command is subdivided into a function command and an edit command. The edit command is further classified into a basic edit command and a free input edit command. The content of this voice input command is preset as a reserved word defined by a fixed phrase text, and interpreted as instructing execution of corresponding processing when an input of the voice recognition text of the corresponding content is detected.

The function command is a command for a basic function of the label printer 1, and in the example of the present embodiment, "load" for instructing to load the template file from the operation terminal 4, "edit" for instructing executing of the print data editing based on the loaded template file, "delete" for instructing to delete the loaded template file, and "print" for instructing to produce the print label L with the print data generated by the print data editing are prepared.

The basic edit command is a command for a basic operation during the print data editing, and in the example of the present embodiment, a cursor movement command such as "upper", "lower", "right", "left", "next" and "previous" for instructing movement directions of the cursor, "No. X" for instructing the identification number of the character option during the selection setting operation ("X" is a numeric value of the selected identification number), and "complete editing" for instructing to complete the print data editing are prepared.

The free input edit command is a command for an operation during the free input setting operation in the print data editing, and "clear" for instructing to clear the print content input by voice until then, and "complete input" for instructing to complete the free input setting operation are prepared.

The content of the voice input data is an unfixed phrase text, and is transmitted and received in a set form in which element data decomposed by appropriate part of speech in the voice recognition processing on the voice recognition server 3 is arranged in an order of utterance.

For each command classified into the voice input command, a corresponding barcode may be prepared in advance and input to the label printer 1 by optical reading by the barcode reader 5. The barcode corresponding to each command corresponds to a command barcode, and the corresponding barcode data corresponds to command information.

In the present embodiment, only the function command is received during a basic operation of the label printer 1 (that is, during an operation other than the print data editing), only the free input edit command is received during the free input setting operation in the print data editing, and only the basic edit command is received during the print data editing other than the above. Thereby, as the voice input data to be input during the free input setting operation, only the words "clear" and "complete input" as the free input edit command cannot be set as the print content. However, all other words, such as "print" which is another command, can be set as the print content (see the input examples in FIGS. 3 and 7 above).

The voice input command corresponds to an execution command. The voice recognition text corresponding to words of each command corresponds to first character data, and the voice recognition text corresponding to the "print" command of these commands corresponds to specific character data. The cursor movement command corresponds to an object switching execution command. The voice recognition text corresponding to the voice input data corresponds to second character data. That the label printer 1 is in a state of the basic operation for receiving only the function command corresponds to a predetermined condition.

<Control Procedures>

Figure 9:
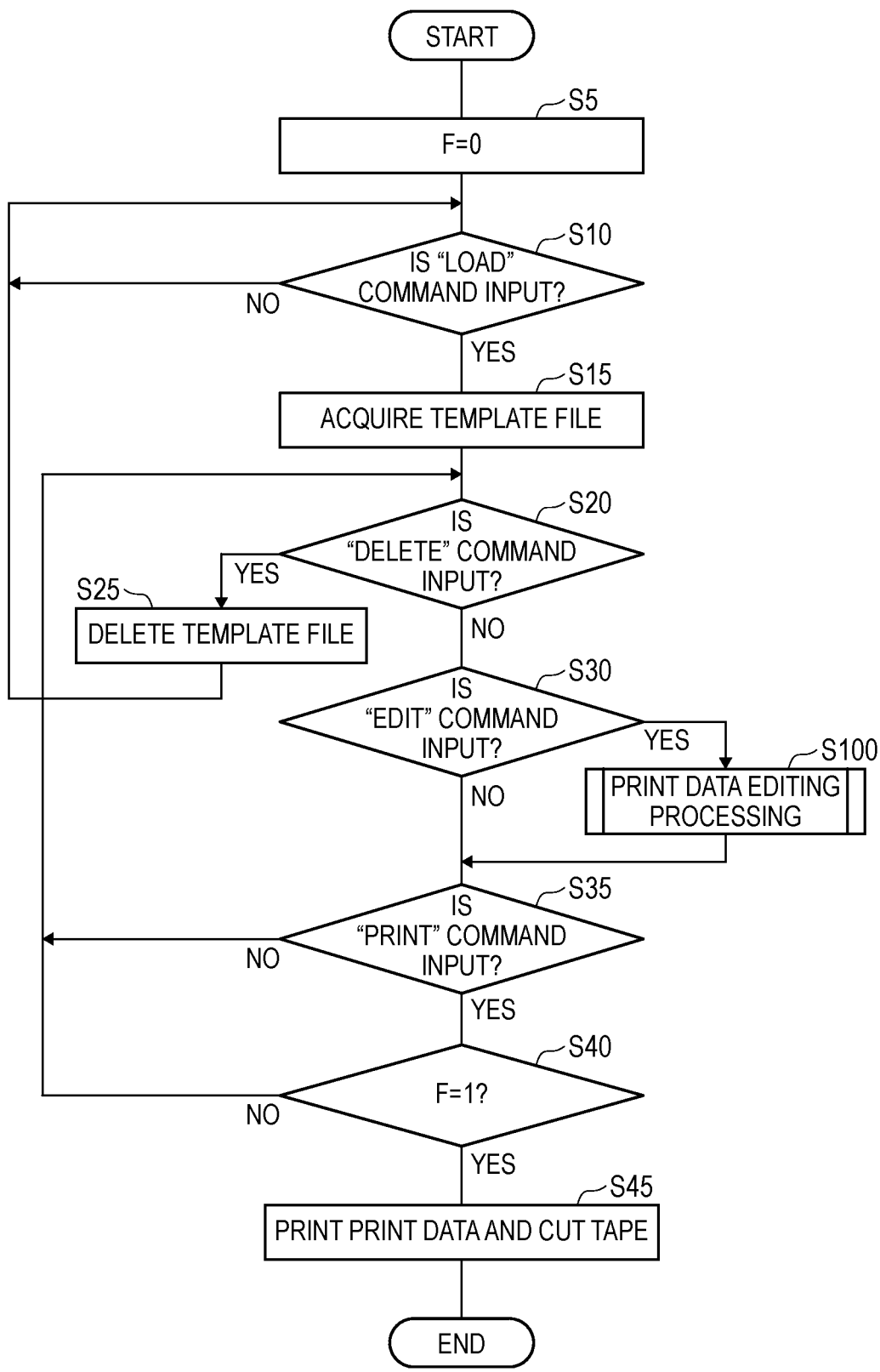
FIG. 9 is a flowchart showing control procedures executed by a control circuit during a basic operation of a label printer.

Flow charts of FIGS. 9 to 12 show control procedures executed by the control circuit 211 of the label printer 1 in order to execute a print data editing method by a method described above. When power of the label printer 1 is turned on, execution of the flowchart of FIG. 9 is started first.

First, in step S5, the control circuit 211 resets a value of a flag F indicating whether the print data editing is executed to 0.

Next, the processing proceeds to step S10, and the control circuit 211 waits in a loop until the "load" command is input, and the processing proceeds to step S15 when the "load" command is input. In the following description, it is assumed that each command may input by any one of an input with the voice recognition text via the smart speaker 2 and an input with the barcode data via the barcode reader 5.

In step S15, the control circuit 211 acquires a template file selected in advance from the operation terminal 4. The procedure of step S15 corresponds to template acquisition processing.

Next, the processing proceeds to step S20, and the control circuit 211 determines whether the "delete" command is input. When the "delete" command is input, the determination is satisfied (S20: YES), and the processing proceeds to step S25.

In step S25, the control circuit 211 deletes the template file acquired in step S15, and then the processing returns to step S10 to repeat the same procedure.

In contrast, when no "delete" command is input in the determination of step S20, the determination is not satisfied (S20: NO), and the processing proceeds to step S30.

In step S30, the control circuit 211 determines whether the "edit" command is input. When the "edit" command is input, the determination is satisfied (S30: YES), print data editing processing in step S100 is executed, and then the processing proceeds to step S35.

In contrast, when no "edit" command is input, the determination is not satisfied (S30: NO), and the processing proceeds to step S35.

In step S35, the control circuit 211 determines whether the "print" command is input. When no "print" command is input, the determination is not satisfied (S35: NO), and the processing returns to step S20 to repeat the same procedure. The procedure of step S35 corresponds to specific data determination processing.

In contrast, when the "print" command is input, the determination is satisfied (S35: YES), and the processing proceeds to step S40.

Figure 10:
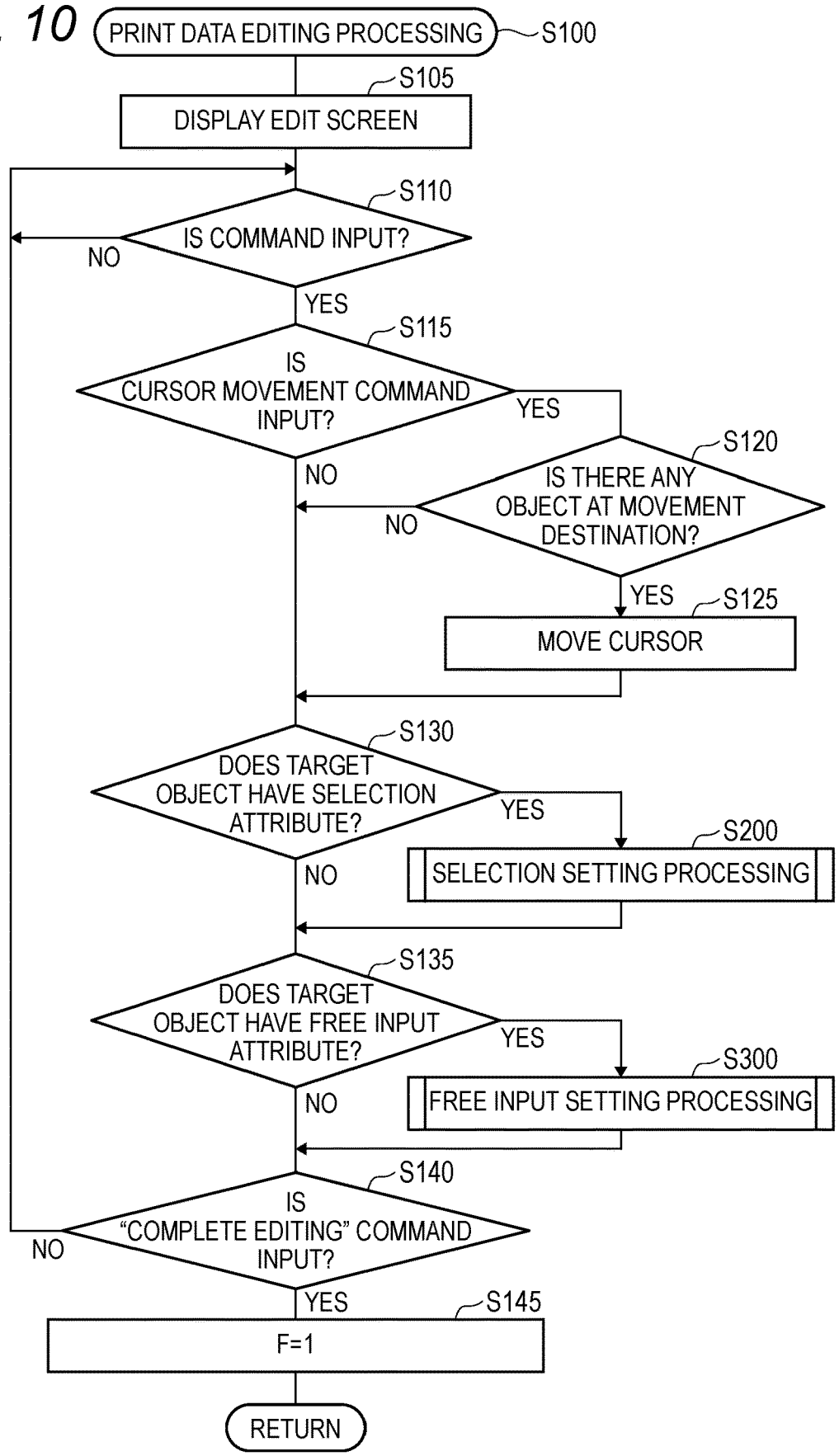
FIG. 10 is a flowchart showing control procedures executed by the control circuit during print data editing processing of the label printer.

In step S40, the control circuit 211 determines whether the value of the flag F is 1, in other words, whether the print data editing is performed even once (see step S145 in FIG. 10 described later). If the value of the flag F is 0, the determination is not satisfied (S40: NO), the processing returns to step S20 to repeat the same procedure.

In contrast, if the value of the flag F is 1, the determination is satisfied (S40: YES), and the processing proceeds to step S45.

In step S45, the control circuit 211 prints the tape 203 based on the print data generated in the print data editing processing in step S100, and cuts the tape with the cutter 207 to produce the print label L. Then, this flow is completed. The procedure of step S45 corresponds to specific processing.

Next, the control procedure in the print data editing processing in step S100 will be described with reference to FIG. 10.

First, in step S105, the control circuit 211 displays an edit screen on the display unit 213 including print content of the template file acquired in step S15.

Next, the processing proceeds to step S110 and the control circuit 211 waits in a loop until any command is input, and the processing proceeds to step S115 when a command is input.

In step S115, the control circuit 211 determines whether the command input in step S115 is any one of the cursor movement commands ("upper", "lower", "right", "left", "next" and "previous" in the example shown in FIG. 8 as described above). If the cursor movement command is input, the determination is satisfied (S115: YES), and the processing proceeds to step S120.

In step S120, the control circuit 211 determines whether there is another text object at a movement destination instructed by the cursor movement command input for a cursor position at that time. If there is no other text object at the destination, the determination is not satisfied (S120: NO), and the processing proceeds to step S130. Whether there is the other text object at the movement destination is determined on an arrangement (an arrangement order) of text objects on the print label L. The arrangement of the text objects at this time corresponds to a predetermined regularity.

In contrast, when there is the other text object at the destination, the determination is satisfied (S120: YES), and the processing proceeds to step S125.

In step S125, the control circuit 211 moves and displays the cursor to the text object at the movement destination instructed by the cursor movement command. Then, the processing proceeds to step S130. The procedure of step S125 corresponds to object specifying processing and object switching processing.

In contrast, when the input command is not the cursor movement command in the determination in step S115, the determination is not satisfied (S115: NO), and the processing proceeds to step S130.

In step S130, the control circuit 211 determines whether an attribute of the target text object on which the cursor is located and that is a setting target at that time is the selection attribute. When the target text object has the selection attribute, the determination is satisfied (S130: YES) and selection processing in step S200 is executed, and then the processing proceeds to step S135.

In contrast, when the target text object does not have the selection attribute, the determination is not satisfied (S130: NO), and the processing proceeds to step S135.

In step S135, the control circuit 211 determines whether the attribute of the target text object on which the cursor is located and that is the setting target at that time is the free input attribute. When the target text object has the free input attribute, the determination is satisfied (S135: YES) and free input processing in step S300 is executed, and then the processing proceeds to step S140.

In contrast, when the target text object does not have the free input attribute, the determination is not satisfied (S135: NO), and the processing proceeds to step S140.

In step S140, the control circuit 211 determines whether the command input in step S115 is the "complete editing" command. When the input command is not the "complete editing" command, the determination is not satisfied (S140: NO), and the processing returns to step S110 to repeat the same procedure.

In contrast, when the input command is the "complete editing" command, the determination is satisfied (S140: YES), and the processing proceeds to step S145.

In step S145, the control circuit 211 assigns a value of 1 to the flag F assuming that the print data editing is executed, and completes this flow.

Next, the control procedures in the selection processing in step S200 will be described with reference to FIG. 11.

First, in step S205, the control circuit 211 lists and displays all the character options set in the template file together with the corresponding identification numbers on the edit screen of the display unit 213. At this time, the smart speaker 2 may utter-output an instruction prompting to select content of the character options.

Next, the processing proceeds to step S210 and the control circuit 211 waits in a loop until the voice recognition text corresponding to a valid identification number (i.e., the basic edit command of "No. X") is input, and the processing proceeds to step S215 when the valid identification number is input.

In step S215, the control circuit 211 sets a character string included in a character option corresponding to the identification number input in step S210 as the print content of the object having the selection attribute. Then, this flow is completed. At this time, the print content of the corresponding character option is displayed on the target text object to be edited, and an utterance is output from the smart speaker 2 to repeat with the corresponding content. A control signal for displaying the print content of the selected character option on the display unit 213 and an utterance text utter-output from the smart speaker 2 correspond to a notification control signal, and processing of the control circuit 211 at this time corresponds to notification control processing. The character string itself included in the character option may be input in step S210, and the input character string may be set as the print content in step S215.

Next, the control procedures in the free input processing in step S300 will be described with reference to FIG. 12.

First, in step S305, the control circuit 211 clears text data to be set as the print content. At this time, the smart speaker 2 may utter-output that free input is started and an instruction for prompting voice input of the print content.

Next, the processing proceeds to step S310, and the control circuit 211 determines whether element data of voice input data decomposed by part of speech is input from the smart speaker 2, in other words, whether a voice recognition text other than words "clear" and "complete input" is input from the smart speaker 2. When no element data is input, the determination is not satisfied (S310: NO), and the processing proceeds to step S325.

In contrast, when the element data is input, the determination is satisfied (S310: YES), and the processing proceeds to step S315.

In step S315, the control circuit 211 adds the character string of the element data input in step S310 to an end of the text data at that time to generate new text data.

Next, the processing proceeds to step S320, and the control circuit 211 displays the text data generated in step S315 on the text object having the free input attribute.

Next, the processing proceeds to step S325, and the control circuit 211 determines whether a "clear" command is input from the smart speaker 2, in other words, whether the voice recognition text of the word "clear" is input from the smart speaker 2. When the "clear" command is input, the determination is satisfied (S325: YES), and the processing returns to step S305 to repeat the same procedure.

In contrast, when no "clear" command is input, the determination is not satisfied (S325: NO), and the processing proceeds to step S330.

In step S330, the control circuit 211 determines whether the "complete input" command is input from the smart speaker 2, in other words, whether the voice recognition text of the words "complete input" is input from the smart speaker 2. When no "complete input" command is input, the determination is not satisfied (S325: NO), and the processing returns to step S310 to repeat the same procedure.

In contrast, when the "complete input" command is input, the determination is satisfied (S325: YES), and the processing proceeds to step S335.

In step S335, the control circuit 211 sets the entire character string included in the text data at that time as the print content of the text object having the free input attribute. At this time, it is advisable to add appropriate punctuation marks (such as a period or a comma) to the character string included in the text data and then set as the print content. At this time, the smart speaker 2 may output an utterance to repeat the content of the text data in the smart speaker 2. Then, this flow is completed.

The input determination of the "clear" command in step S325 and the input determination of the "complete input" command in step S330 may be determined based on an input from the barcode reader 5.

In each flowchart described above, each procedure of steps Sb, S20, S30, S35, S110, S210, S310, S325 and S330 corresponds to data acquisition processing and the data determination processing, and each procedure other than step S310 among them corresponds to information acquisition processing. Each procedure of steps S130 and S135 corresponds to attribute identification processing. Each procedure of steps S215 and S335 corresponds to character assignment processing. Each procedure of steps S15, S25, S100, S45, S125, S200, S300, S145, S215, S315, S320, S305 and S335 corresponds to first command processing, and each procedure other than steps S315 and S320 corresponds to second command processing.

<Effects According to Embodiment>

As described above, in the label printer 1 according to the present embodiment, since two attributes including the selection attribute and the free input attribute are prepared in advance for the text object included in the template file, when performing voice input by uttering the print content to be assigned to the text object included in the template file, the user can input by a convenient method according to their own preference, a surrounding environment and the like. Thereby, convenience for the user when producing the print label L that represents content of the voice input by an utterance can be improved.

Particularly in the present embodiment, when it is identified that an attribute of the target text object to be edited at that time is the selection attribute, the control circuit 211 outputs the control signal that represents the character string assigned to the target text object and included in the character option corresponding to a voice recognition text (the basic edit command of "No. X") selected and acquired by the user, to the display unit 213 or the smart speaker 2 so as to display or repeat the character string. Thereby, when the target text object is the selection attribute and the user selects one character option, the character string corresponding to the selected option is notified to the user by voice or display. As a result, the user can accurately recognize what kind of character string is assigned to the target text object according to the option selected by the user.

Particularly in the present embodiment, the control circuit 211 further determines whether the input voice recognition text is a voice input command for instructing the label printer 1 to execute predetermined processing or voice input data other than the voice input command, executes each processing corresponding to the voice input command when the input voice recognition text is determined to be the voice input command, and executes processing of assigning the voice input data to the target text object having the free input attribute when the input voice recognition text is determined to be the voice input data.

Thereby, in addition to an operation of producing the print label L that represents the utterance content as described above, the user can cause the label printer 1 to execute the predetermined process determined in advance by uttering a command verbally.

Particularly in the present embodiment, as the input voice input command, processing of determining whether the command is the "print" command instructing execution of specific predetermined processing (print processing in this example) is executed. The control circuit 211 executes the print processing when the input voice recognition text is determined in the "print" command determination processing to be the "print" command and when the control circuit 211 is in a state of the basic operation that receives only the function command.

As described above, in the present embodiment, when the user utters, the print label L that represents the utterance content can be produced or the predetermined processing against the label printer 1 can be executed. In this case, an erroneous processing operation due to erroneous recognition may be desired to be avoided as much as possible, for example, by uttering "Print" for causing the label printer 1 to print as the predetermined processing.

Therefore, in the present embodiment, voice recognition data such as "Print" that is related to the specific processing (such as the print processing) desired to avoid the erroneous recognition as much as possible is preset as the "print" command of the basic edit command received only during the basic operation. When the control circuit 211 determines whether the input voice recognition text is the voice input command or the voice input data, the control circuit 211 also determines whether the voice recognition text is the "print" command. When it is determined that the command is the "print" command, the print processing is limitedly executed only if a predetermined condition (a state during the basic operation) set in advance is satisfied. Thereby, careless execution of the specific processing such as printing due to the erroneous recognition can be prevented as much as possible.

The "print" command is just set not to be received as the free input edit command, and may be set to be accepted as the basic edit command, for example. Specifically, in the flow of the print data editing processing shown in FIG. 10, for example, a step of determining whether the command input in step S110 is the "print" command may be provided after step 135 (or step S300), and the same print processing (the specific processing) as in step S45 may be executed (not particularly shown) when the "print" command is determined to be input. The step of determining the "print" command in this case corresponds to the specific data determination processing. Even when the "print" command is determined to be input at this time, the print processing may be further executed only when a predetermined condition is satisfied. For example, the predetermined condition is whether the text object on which the cursor is located is the last text object in an editing order at that time, or whether setting of the print content for a specific text object or all the text objects is completed at that time. Thereby, the print processing during the print data editing can be avoid.

Particularly in the present embodiment, the template file includes a plurality of text objects, and when the input voice recognition text is determined to be the voice recognition text that represents the cursor movement command for sequentially switching the target text object to be edited at that time, the control circuit 211 further executes processing of switching the target text object to be edited at that time to another target text object according to a predetermined regularity such as an arrangement and an order of the plurality of text objects.

Thereby, when the plurality of text objects are included in the template file, the target text object to be edited at that time can be sequentially switched by a command uttered by the user.

Particularly in the present embodiment, in a state where the specified target text object is a last target text object according to the regularity, when the input voice recognition text is determined to be a voice input command that represents the cursor movement command, the control circuit 211 does not execute moving the cursor.

Thereby, when the plurality of text objects are arranged side by side on the print label L in the template file and when the cursor movement command for further moving the cursor in a direction toward a certain direction is given by a command uttered by the user to the cursor on the text object located at an end of the certain direction, for example, the command is ignored. As a result, in the above case, movement of the cursor that designates the editing target can be intentionally prevented. The cursor may not move on the text object having the fixed attribute, but may move only on the text object having the selection attribute and the free input attribute. The cursor may not be displayed on the display unit 213, and a movement of a cursor position to be edited may be managed only by internal control.

Particularly in the present embodiment, the communication control unit 215 that performs wired or wireless connection to the barcode reader 5 is also provided. The control circuit 211 further executes processing of acquiring barcode data read from a barcode corresponding to a command by the barcode reader 5 connected via the communication control unit 215, and processing corresponding to the barcode data of the acquired command.

Thereby, the user can not only cause the label printer 1 to execute intended processing by utterance, but also cause the label printer 1 to execute the same processing by reading the barcode of the command corresponding to the intended processing with the barcode reader 5. Accordingly, desired processing can be reliably executed by the label printer 1 even when the erroneous recognition of the utterance content is likely to occur due to a fairly noisy environment or the like.

<Modification>

The present disclosure is not limited to the above embodiment, and various modifications can be made without departing from the spirit and technical scope of the present disclosure. Such modifications will be described below in order. In each modification, the same components as those in the above embodiment are denoted by the same reference numerals, and the description and illustration thereof are omitted or simplified as appropriate.

(1) In a Case where Selection Setting Processing Based on Voice Input is Automatically Interrupted As described above, when the text object is the selection attribute, the user needs to select any one of the plurality of corresponding character options. However, the input voice recognition text may not correspond to any one of the character options as a result of the erroneous recognition even in selection of the character option by utterance of the user, for example, when the surrounding environment is fairly noisy.

In the present modification, in such a case, when an attribute of the target text object to be edited at that time is the selection attribute, and when the input voice recognition text (the basic edit command of "No. X") to be applied to the target text object does not correspond to any one of the plurality of character options, the control circuit 211 may automatically executes application interruption processing of interrupting application of the input voice recognition text to the assignment against the target text object. As a specific example of the application interruption processing, when the voice recognition text of a valid identification number is not input for a certain period of time during the loop waiting in step S210 in the selection processing of FIG. 11, the selection processing may end and the processing may return to the print data editing processing of FIG. 10 (not particularly shown).

In this way, the application interruption processing is executed by the control circuit 211, and the voice recognition text is interrupted to be assigned to the text object having the selection attribute. Thereby, when the erroneous recognition frequently occurs in the fairly noisy environment, character data based on the utterance of the user can be prevented from being represented in a printed matter.

In the present modification, after the application interruption processing is executed, and when the input voice recognition text to be applied to the target text object having the selection attribute corresponds to any one of the plurality of character options, the control circuit 211 may further execute application resumption processing of resuming the application of the input voice recognition text to the assignment against the target text object.

Thereby, for example, even if the application interruption processing is executed by the control circuit 211 in the fairly noisy surrounding environment, w % ben the noise is reduced thereafter, the control circuit 211 executes the application resumption processing, so that production of the print label L that represents the utterance content can be resumed. The barcode data such as a "interrupt" command or a "resume" command received during the selection processing and for executing the application interruption processing or the application resumption processing may be set. The application resumption processing in this case corresponds to first application resumption processing.

In addition, various other processing methods may be applied to the application resumption processing. For example, after the application interruption processing is executed, and when the input voice recognition text to be applied to the target text object having the selection attribute corresponds to the voice recognition text (for example, "voice input enabled") corresponding to a specific resumption command for resuming the application to the assignment against the target text object (classified into the basic edit command), the control circuit 211 may further execute the application resumption processing that resumes the application of the input voice recognition text to the assignment processing (not particularly shown).

Thereby, for example, even if the application interruption processing is executed by the control circuit 211 in the fairly noisy surrounding environment, when the user desires to forcibly resume the processing thereafter, the user make a specific utterance to acquire the corresponding resumption command. Thereby, the control circuit 211 executes the application resumption processing, and the production of the print label L that represents the utterance content can be resumed. The application resumption processing in this case corresponds to second application resumption processing, and the resumption command corresponds to resumption data.

As another application resumption processing, after the application interruption processing is executed, and when the voice recognition text is not input for a certain period of time (=no voice input), the control circuit 211 may further execute the application resumption processing of resuming the application of the input voice recognition text to the assignment processing against the text object having the selection attribute.

Thereby, for example, even if the application interruption processing is executed by the control circuit 211 in the fairly noisy surrounding environment, when surroundings become quiet and a silent state continues for a certain period of time thereafter, the control circuit 211 executes the application resumption processing, so that the production of the print label L that represents the utterance content can be resumed. The application resumption processing in this case corresponds to third application resumption processing.

(2) In a Case where Character Option is Increased in Selection Setting Processing When the text object is the selection attribute, if the voice recognition text input based on the utterance of the user does not correspond to any character option, an option having content that the user desires may not be provided.

Therefore, in the present modification, in the above case, a plurality of character options are stored in the memory 212, and when an attribute of the target text object to be edited at that time is identified as the selection attribute and the input voice recognition text to be applied to the target text object does not correspond to any one of the plurality of character options, the control circuit 211 further executes option addition processing of adding a new option to the plurality of character options stored in the memory 212.

Figure 11:
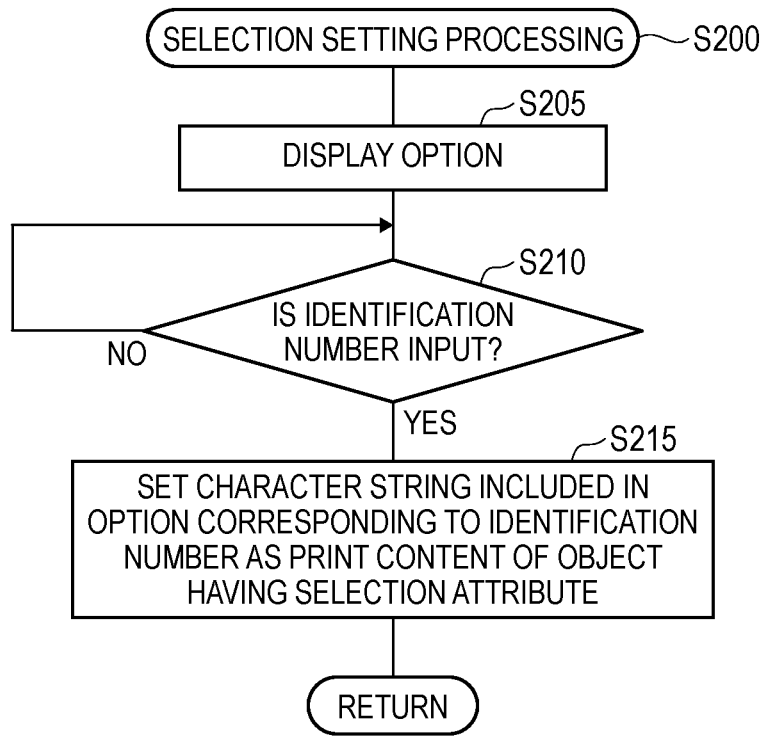
FIG. 11 is a flowchart showing control procedures executed by the control circuit during selection processing of the label printer.

As a specific example of the option addition processing, when a voice recognition text of a new identification number other than the valid identification number is input during the loop waiting in step S210 in the selection processing of FIG. 11, a display or an utterance output is performed to prompt the user to input a new character option corresponding to the new identification number. When a voice recognition text of a new character option is input as a response, the new character option may be assigned to the text object, and the new character option may be added to and recorded in the template file (not particularly shown).

As described above, in the present modification, the control circuit 211 executes the option addition processing, and adds the new option (for example, corresponding to the utterance content) to the plurality of character options stored in the memory 212. Thereby, after the addition, the user can easily produce the print label L that represents the input content intended by the user by selecting the option added by utterance. The voice input command (the basic edit command) such as an "add" command received during the selection processing and for executing the option addition processing or the barcode data may be set.

(3) In a Case where Attribute of Text Object is Dynamically Changed

Although the setting of the attribute of each text object is performed by the template file editing in the operation terminal 4, the setting of each attribute may be desired to be changed even in the print data editing in the label printer 1.

Therefore, in the present modification, when the input voice recognition text is determined to be a voice input command for switching an attribute of the target text object to be edited at that time, the control circuit 211 further executes attribute switching processing of switching the attribute of the target text object from the free input attribute to the selection attribute or from the selection attribute to the free input attribute.

Figure 12:
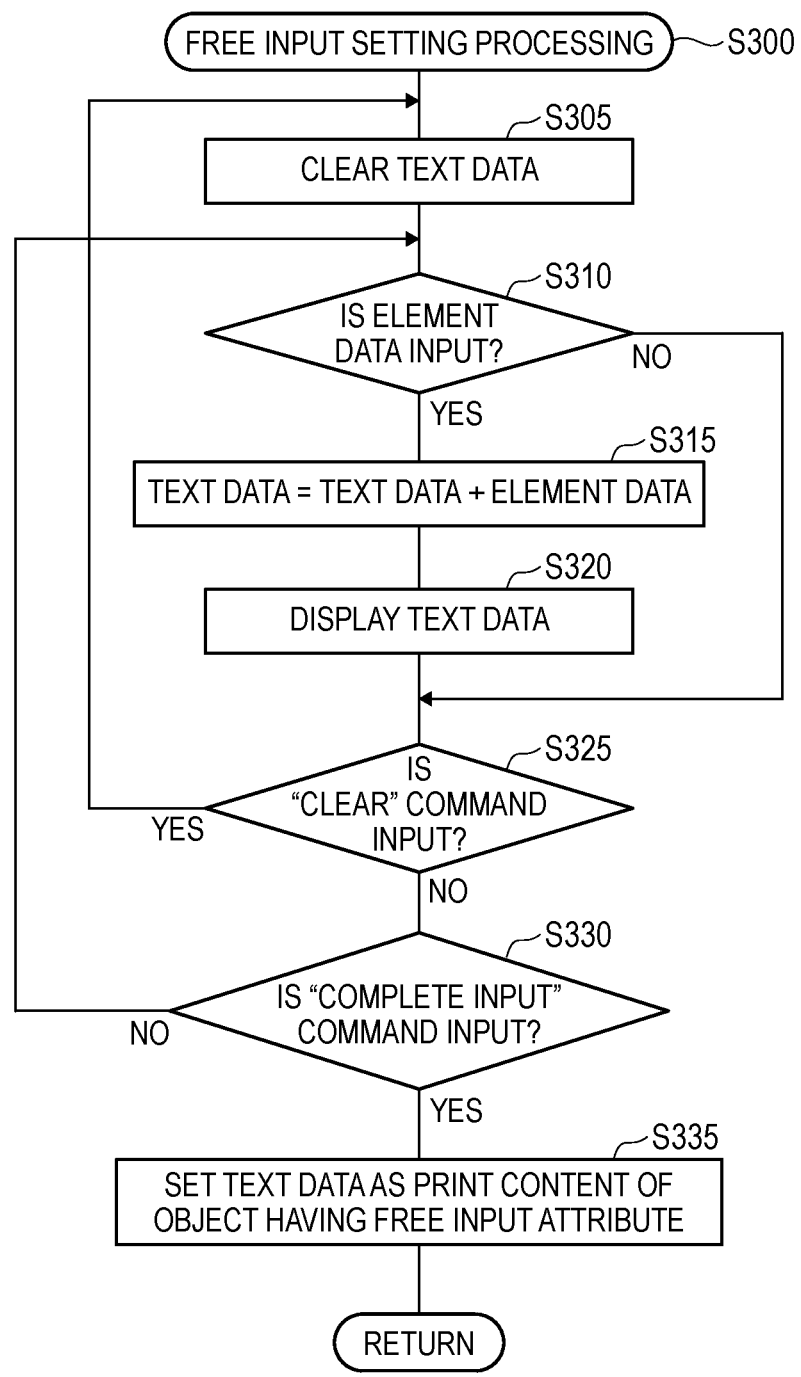
FIG. 12 is a flowchart showing control procedures executed by the control circuit during free input processing of the label printer.

As a specific example of the attribute switching processing, a "switching" command as the basic edit command or the free input edit command can be received during the loop waiting in step S210 in the selection processing of FIG. 11 or in the loop of the free input processing of FIG. 12. When the "switching" command is input, the attribute of the text object to be edited at that time may be switched. This specific example is not particularly shown in the drawings. The "switching" command corresponds to an attribute switching execution command, and a corresponding voice recognition text corresponds to the first character data and the specific character data.

Thereby, the user can appropriately switch the attribute of the text object included in the template file between the free input attribute and the selection attribute by an own utterance. As a result, the convenience for the user can be further improved.

In the above description, arrows shown in the drawings, such as FIGS. 1, 2, 6 and 7 show an example of a signal flow, and do not limit a flow direction of a signal.

The flowcharts shown in FIGS. 9, 10, 11 and 12 are not intended to limit the present disclosure to the procedures shown in the above flow, and procedures may be added, deleted or changed in order without departing from the spirit and technical scope of the present disclosure.

In addition to those described above, the methods according to the embodiment and the modifications may be used in combination as appropriate.

In addition, although not shown one by one, the present disclosure is carried out with various modifications without departing from the spirit of the present disclosure.

What is claimed is:
1. A printing device comprising:
a conveyance device configured to convey a printing medium;
a print head configured to print on the printing medium conveyed by the conveyance device; and
a control device configured to execute:
template acquisition processing of acquiring a template from an external device, the template including at least on text object, the at least on text object including a first item as an attribute and a second item as a text content, the at least one text object including a first text object and a second object, the attribute that is the first item of the first text object being set to a first attribute in which a text content is freely input, the text content that is the second item of the first text object to be set, the attribute that is the first item of the second text object being set to a second attribute in which a text content is selectively input from a first predetermined character option and a second predetermined character option, the text content that is the second item of the second text object being set to the first character option and the second character option;
object specifying processing of specifying one target text object of the least one text object included in the template acquired in the template acquisition processing;
data acquisition processing of acquiring character data input by voice or text-converted by voice recognition;

attribute identification processing of identifying an attribute of the target text object specified in the object specifying processing;

character assignment processing of,
when the attribute that is the first item of the target text object is identified as the first attribute in the attribute identification processing, assigning the acquired character data to the first text object that is the target text object, as a character string, and when the attribute that is the first item of the target text object is identified as the second attribute in the attribute identification processing, assigning a character string included in a character option corresponding to the acquired character data to the second text object that is the target text object, the character option being one of the first character option and the second character option, the first character option and the second character option being the text contents that are the second item of the second text object that is the target text object; and a printing operation including:
controlling the conveyance device to position the printing medium about the print head;
controlling the print head to print, using the template that includes the target text object, onto the printing medium; and
controlling the conveyance device to output the printed medium from the printing device.

2. The printing device according to claim 1,
wherein the control device is configured to execute:
when the attribute of the target text object is identified as the second attribute in the attribute identification processing, notification control processing of outputting a notification control signal that represents the character string assigned to the target text object and included in the character option corresponding to the acquired character data.

3. The printing device according to claim 1,
wherein the control device is further configured to execute:
when the attribute of the target text object is identified as the second attribute in the attribute identification processing, and the character data acquired in the data acquisition processing and to be applied to the target text object does not correspond to any one of the first character option and the second character option, application interruption processing of interrupting application of the character data acquired by the data acquisition processing to the character assignment processing.

4. The printing device according to claim 3,
wherein the control device is further configured to execute:
after the application interruption processing is executed, and when the character data acquired in the data acquisition processing and to be applied to the target text object corresponds to any one of the first character option and the second character option, first application resumption process of resuming the application of the character data acquired by the data acquisition processing to the character assignment processing.

5. The printing device according to claim 3,
wherein the control device is further configured to execute:

after the application interruption processing is executed, and when the character data acquired in the data acquisition processing and to be applied to the target text object corresponds to specific resumption data for resuming the application to the character assignment processing, second application resumption processing of resuming the application of the character data acquired by the data acquisition processing to the character assignment processing.

6. The printing device according to claim 3,
wherein the control device is further configured to execute:
after the application interruption processing is executed, and when the character data is not acquired by the data acquisition processing for a certain period of time, third application resumption processing of resuming the application of the character data acquired by the data acquisition processing to the character assignment processing.

7. The printing device according to claim 1, further comprising:
a memory storing the first character option and the second character option,
wherein the control device is further configured to execute:
when the attribute of the target text object is identified as the second attribute in the attribute identification processing, and the character data acquired in the data acquisition processing and to be applied to the second text object that is the target text object does not correspond to any one of the first character option and the second character option, option addition processing of adding a new third option to the first character option and the second character option stored in the memory.

8. The printing device according to claim 1,
wherein the control device is configured to execute:
data determination processing of determining whether the character data acquired in the data acquisition processing is first character data that represents an execution command for executing predetermined processing to the printing device, or second character data other than the first character data;
first command processing corresponding to the execution command when the acquired character data is determined in the data determination processing to be the first character data; and
the character assignment processing when the acquired character data is determined in the data determination processing to be the second character data.

9. The printing device according to claim 8,
wherein the data determination processing includes specific data determination processing of determining whether the first character data is specific character data that represents the execution command for executing predetermined specific processing, and
wherein the control device is configured to execute:
the specific processing when the acquired character data is determined in the specific data determination processing to be the specific character data and a predetermined condition is satisfied.

10. The printing device according to claim 8,
wherein the control device is further configured to execute:
when the acquired character data is determined in the data determination processing to be the first character data that represents an attribute switching execution command for switching the attribute of the target text object, attribute switching processing, as the first command processing, of switching the attribute of the first text object that is the target text object from the first attribute to the second attribute or the attribute of the second text object that is the target text object from the second attribute to the first attribute.

11. The printing device according to claim 8,
wherein the template includes a plurality of text objects, the plurality of text object including at least one of the first text object and the second text object, and
wherein the control device is further configured to execute:
  when the acquired character data is determined in the data determination processing to be the first character data that represents an object switching execution command for sequentially switching the target text object specified in the object specifying processing, object switching processing, as the first command processing, of switching the target text object specified in the object specifying processing to another target text object according to a predetermined regularity.

12. The printing device according to claim 11,
wherein, in the object switching processing, in a state where the target text object specified in the object specifying processing is a last target text object according to the predetermined regularity, when the acquired character data is determined in the data determination processing to be the first character data that represents the object switching execution command, the control device does not execute the object switching processing.

13. The printing device according to claim 1,
wherein a barcode reader is connected to the printing device via wired or wireless connection, and
wherein the control device is further configured to execute:
  information acquisition processing of acquiring command information read from a command barcode by the barcode reader; and
  second command processing corresponding to the command information acquired by the information acquisition processing.

14. The printing device according to claim 1, further comprising a display unit,
wherein the control device is further configured to execute:
  display processing of displaying an edit screen on the display unit; and
  when the attribute that is the first item of the target text object is identified as the first attribute in the attribute identification processing, in state that a print data editing is started, by an unset in which the text object that is the second item of the first text object that is the target text object is to be set, the display processing of displaying the first text object that is the target text object as a blank on the display unit.

15. The printing device according to claim 1, further comprising a display unit,
wherein the control device is further configured to execute:
  display processing of displaying an edit screen on the display unit; and
  when the attribute that is the first item of the target text object is identified as the second attribute in the attribute identification processing, in state that a print data editing is started, the display processing of displaying the second text object that is the target text object as a blank on the display unit.

16. The printing device according to claim 15,
wherein the edit screen includes a first display area and a second display area, and
wherein the control device is further configured to execute:
  the display processing of displaying a print content to be printed on the printing medium on the first area of the edit screen; and
  when the attribute that is the first item of the target text object is identified as the second attribute in the attribute identification processing, in state that the print data editing is started, the display processing of displaying the first character option and the second character option that are the second item of the second text object that is the target text object on the second area of the edit screen.

* * * * *